United States Patent [19]
Breaker

[11] Patent Number: 5,427,386
[45] Date of Patent: Jun. 27, 1995

[54] PROTECTIVE SEAL FOR USE IN FLUID FLOW LINES AND METHOD THEREFOR

[75] Inventor: John V. Breaker, Golden, Colo.

[73] Assignee: Corrosion Control Corp., Lakewood, Colo.

[21] Appl. No.: 960,781

[22] Filed: Oct. 14, 1992

[51] Int. Cl.⁶ .............................................. F16J 15/12
[52] U.S. Cl. ................................. 277/26; 277/207 A; 285/187; 285/368
[58] Field of Search ................ 277/1, 26, 203, 207 A, 277/165, 235 R; 285/187, 363, 368, 923

[56] References Cited

U.S. PATENT DOCUMENTS

| | | |
|---|---|---|
| 1,825,962 | 10/1931 | Laird . |
| 1,965,273 | 7/1934 | Wilson . |
| 2,462,493 | 2/1949 | Hamer . |
| 3,836,183 | 9/1974 | Battle . |
| 3,869,132 | 3/1975 | Taylor et al. .......................... 277/26 |
| 3,930,656 | 1/1976 | Jelinek ............................ 285/363 X |
| 4,109,923 | 8/1978 | Tückmantel . |
| 4,268,070 | 5/1981 | Adams . |
| 4,288,105 | 9/1981 | Press ............................... 255/368 X |
| 4,406,467 | 9/1983 | Burger et al. . |
| 4,669,759 | 6/1987 | Harbeke ........................... 277/26 X |
| 4,673,187 | 6/1987 | Hanson et al. ......................... 277/26 |
| 4,690,438 | 9/1987 | Kanczarek . |
| 4,776,600 | 10/1988 | Kohn . |
| 4,790,544 | 12/1988 | Kemp ..................................... 277/34 |
| 4,795,166 | 1/1989 | Irmler ............................... 277/26 X |
| 4,826,220 | 5/1989 | Ross ..................................... 285/363 |
| 4,871,181 | 10/1989 | Usher et al. ..................... 285/368 X |

FOREIGN PATENT DOCUMENTS

| | | | |
|---|---|---|---|
| 101361 | 6/1985 | Japan ........................................ 277/26 |
| 224571 | 9/1989 | Japan ....................................... 277/204 |
| 2141187 | 12/1984 | United Kingdom .................... 277/26 |
| 2244782 | 12/1991 | United Kingdom .................... 277/26 |

Primary Examiner—Daniel G. DePumpo
Attorney, Agent, or Firm—Timothy J. Martin

[57] ABSTRACT

A protective seal and method for protecting flow line joints from leakage of fluid conveyed thereby when exposed to elevated temperatures, such as fire, employs the use of intumescent material and a channeling structure for channeling the intumescent material into a separation gap caused by thermal separation of adjacent flow line pieces, e.g., pipe sections. The channeling structure may be a channel formed in the connecting flanges, or in a gasket interposed between the pieces. Alternatively, the channeling structure may be an annulus for directing the intumescent material radially inwardly into the separation gap or a channeling strip in a spiral wound gasket. Where a channel is provided in the flange or gasket, a seal element may be used, and the intumescent material material provides a driving force to advance the seal into the separation gap. The intumescent material material may be bounded by a diaphragm or contained within a bladder. The method is directed to channeling intumescent material into the separation gap by various channeling structures.

18 Claims, 5 Drawing Sheets

PROTECTIVE SEAL FOR USE IN FLUID FLOW LINES AND METHOD THEREFOR

FIELD OF INVENTION

The present invention generally concerns protective seals and seal elements for use in fluid flow lines in order to reduce leakage at the interface between joined pieces forming the flow line when the flow line is subjected to elevated temperatures. More specifically, the present invention is directed to a protective seal device which expands under the influence of elevated temperatures, such as would occur during a fire, in order to fill separation gaps which might occur at joints in the pieces which form a flow line in order to reduce or eliminate the risk of leakage of material carried in the flow line. Correspondingly, the present invention also concerns a method of thermally protecting a fluid flow line upon exposure to elevated temperatures.

BACKGROUND OF THE INVENTION

It is well-known to use flow lines to convey various fluids from one location to another. Flow lines are used at virtually all stages of processing of fluids, including production facilities, storage facilities and processing facilities. Quite often the fluids are conveyed under pressure in pipeline systems, and it is not uncommon that the fluid conveyed by pipeline systems is hazardous due either to its toxicity, corrosiveness, flammability or the like. Despite the dangerous nature of such chemicals, modern technology relies heavily on their use in industry.

Pipelines are usually constructed of a plurality of pieces or sections joined together to form a continuous fluid communication pathway. In such pipeline systems, it is well-known to use seals at the interfaces between joined pieces to prevent leakage of the fluid at the joint. Commonly these seals are in the form of gaskets interposed between the joined pieces at their interface with the gaskets carrying compressible seal rings. In some instances, isolation gaskets are used in critical service applications to electrically isolate adjacent pieces of the pipeline.

Wherever industry is practiced, there is always the risk of fire, and this risk is compounded where flammable or explosive fluids are conveyed by pipeline systems. In the event of a fire at a facility using such pipeline facilities, the heat generated by the fire can stress the pipeline system due to the thermal expansion of the pieces which form the pipeline. For example, where steel piping is used, thermal expansion due to extremely elevated temperatures can cause separation of the pipe segments at their flange joints. When this occurs, the fluid conveyed by the pipeline can readily leak into the environment. Not only is there a risk that workers and equipment will become exposed to such fluids or their vapors, but also, where the fluids are flammable or explosive, leakage at separation gaps between the pipeline segments can allow a fire to be fed by the fluid. For example, at oil refineries, a fire poses substantial risk since leakage of the oil or gas at the refinery will provide additional fuel for the fire making it extremely difficult if not impossible to contain the fire. Due to the extreme flammability of these materials, it is sometimes impossible to evacuate workers from the site when a fire occurs.

It has been recognized that an interface gasket may be employed in order to help reduce the risk of leakage from thermal separation of pipeline sections when subjected to elevated temperature such as occur in fire situations. An example of such is shown in U.S. patent application No. 801,770 entitled FIREPROOF GASKET FOR PIPE FLANGES. In this disclosure, a gasket in the shape of a Belleville spring washer is disclosed, and the surfaces of this gasket are provided with annular seals. The gasket is compressed between the flanges of joined pipe segments in order to apply this seal therebetween. Should the pipe segments be separated by thermal expansion or stress on the system, the gaskets can flex to compensate for the separation gap.

While not disclosing gaskets for fireproof purposes, other expandable gaskets are known. One example of an expandable gasket is shown in U.S. Pat. No. 1,825,962 issued 6 Oct. 1931 to Laird, and another example of an expandable gasket is shown in U.S. Pat. No. 1,965,273 issued 3 Jul. 1934 to Wilson. The gasket taught in the Laird patent is an annular gasket element formed of relatively soft metal configured in a frustoconical shape. This metallic washer is simply compressed between the flanges of a pair of joined pipe sections. Wilson discloses similar frustoconical metallic gaskets but includes a variety of configurations of auxiliary webs to enhance the seal between the flanges of two pipe sections.

Present day fireproof gaskets commonly employed in the connection of pipes and installations subject to a high degree of fire hazard employ old and traditional approaches using spiral wound metallic gaskets or gaskets made of graphite based material. While there is no doubt that these present day fireproof gaskets are made of a material or materials capable of withstanding the elevated temperatures encountered in fire situations, they are still subjected to leakage at the pipe section interfaces when separation gaps are caused by thermal expansion.

Heretofore, it has also been known to use intumescent material in applications where there is the hazard of fire. Such intumescent material maybe a graphite catalyzed polyurethane, silicone, polyester or other such materials which expand in volume under the influence of elevated temperatures. This material can be compounded to activate at different temperatures so that it may only become activated under the influence of a fire. The primary use of such intumescent material has been to surround pipes and cables where they pass through walls or fire protected compartments in order to reduce or prevent the passage of smoke, fumes or fire through or around the pipes or cables. One such product is a pipe sleeve marketed by Fire Store, Ltd.

Despite the development of different gasket configurations, there remains a need for improved protective seals which can be used in conjunction with fluid flow lines, such as pipeline systems. There is a need for such a protective seal that will activate at elevated temperatures caused by a fire condition and which will directly act on the interface between joined pieces in a flow line in order to reduce or eliminate leakage due to separation gaps between those pieces resulting from thermal expansion. There is a further need for such seals that can be originally installed when pipeline systems are constructed or which can be inserted as retro-fit elements on such pipeline systems.

SUMMARY OF THE INVENTION

It is an object of the present invention to provide a new and useful protective seal and method adapted to maintain the integrity of a seal between joined pieces in a fluid flow line when subjected to elevated temperatures.

Another object of the present invention is to provide a fluid seal and method therefore adapted to reduce or eliminate leakage caused at the interface between joined pieces in a pipeline when the interface is subjected to thermal separation should the flow line be subjected to a fire condition.

A further object of the present invention is to provide a protective seal which can retro-fit onto existing pipeline systems without the need for extensive modification.

Still a further object of the present invention is to provide a protective seal and method employing intumescent material directly at the interface between joined pieces of a flow line.

Still a further object of the present invention is to provide a protective seal gasket which maybe interpose between the flanges of joined pieces in a flow line which gasket operates both to seal the interface but which employs intumescent material either in conjunction with the primary seal or as an auxiliary seal to protect the interface when subjected to thermal expansion caused by fire.

In order to accomplish these objects, then, the present invention contemplates a protective seal and a method for protecting a fluid flow line when exposed to elevated temperatures such as would occur during a fire. The protective seal element and the method is directing to retarding or eliminating leakage at a separation gap which results from thermal separation of joined pieces forming the flow line.

In its general form, the protective seal element according to the present invention utilizes an intumescent material in a channeling structure for the intumescent material. The intumescent material has a selected activation temperature such that the material expands at temperatures greater than the activation temperature. The channeling structure which is associated with the intumescent material is operative to channel the intumescent material into the separation gap when the joined pieces comprising the flow line are subjected to temperatures greater than the activation temperature. Here, the protective seal may include at least one closed channel formed in at least one of the joined pieces, and the intumescent material is disposed within that channel. A seal element in the form of a ring seal, diaphragm or bladder may be disposed within the channel and positioned such that expansion of the intumescent material advances the seal element into the separation gap that results from thermal separation of the joined pieces.

In its more specific form, the protective seal element according to the present invention is constructed as a gasket having a flat gasket body with opposite side surfaces facing the joined pieces and a central opening formed therethrough to accommodate the flow of fluid. The channeling structure is then associated with the gasket body, and the intumescent material is disposed within the channeling structure. In one form of the invention, the channeling structure includes a channel formed in at least one, but preferably both, of the side surfaces of the gasket body in a closed loop surrounding the central opening. Alternatively, the channeling structure may be an annulus which extends around the gasket body with the intumescent material being retained in a region between the annulus and the gasket body. In another embodiment, the gasket is of a spiral wound type wherein a strip of intumescent material and a strip of a channeling material are spirally wound around a core.

The gasket body may be an isolation or a nonisolation type. In either event, where channel structures at the surfaces of the gasket body are provided, the intumescent material may be disposed proximate to the bottom wall of the channel and a ring seal may be positioned in the channel above the intumescent material. The intumescent material may be contained within an expandable bladder, or a diaphragm element may be positioned between the ring seal and the intumescent material. Thus, as the bladder expands or as the diaphragm is moved upwardly in the channel, the seal element is advanced into the separation gap. Fiber bodies may be included within the intumescent material to increase its flow resistance.

The general method according to the present invention contemplates the step of disposing intumescent material at a location proximate to the interface between joined pieces in a flow line and the step of channeling the intumescent material into the separation gap when the joined pieces are subjected to temperatures greater than the activation temperature of the intumescent material. This method may also include the step of providing a seal element proximate to the intumescent material and expanding the intumescent material to move the seal element into the separation gap. The method according to the present invention may channel the intumescent material either radially or axially into the separation gap with respect to the flow line.

These and other objects of the present invention will become more readily appreciated and understood from a consideration of the following detailed description of the preferred embodiment when taken together with the accompanying drawings, in which:

DETAILED DESCRIPTION OF THE EXEMPLARY EMBODIMENTS

The present invention generally concerns the use of intumescent materials in forming a protective seal at the interface joined between joined pieces in a flow line, such as a pipeline system. Accordingly, the present invention also is directed to a method for protectively sealing the interface between such joined pieces in order to reduce or eliminate leakage of the fluid conveyed by the flow line should the flow line be subjected to elevated temperatures that would occur, for example, during a fire. Specifically, the present invention is directed to using intumescent material in combination with pipe flange gaskets in critical surface applications where the pipeline may be exposed to a fire hazard. It should be appreciated, though, that the technology described herein can be used in any application where a seal is desired between joined pieces in a flow line that is operative to convey any fluid so that the ordinarily skilled engineer should readily implement the improvements and embodiments described with respect to the present invention in situations that require a fire resistant seal between joined pieces of a flow line.

Figures 1, 2:
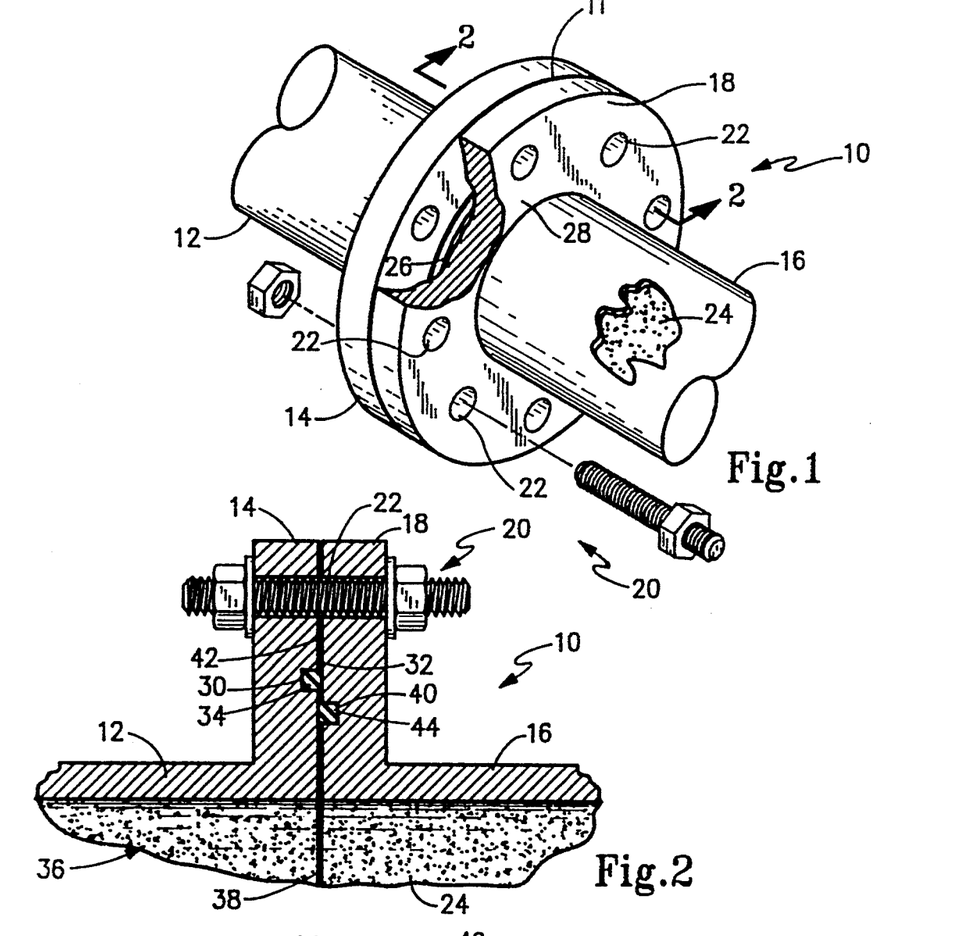
FIG. 1 is a perspective view of a representative interface between the flanges of two pipeline segments showing an exemplary embodiment with a protective seal structure and method according to the present invention.
FIG. 2 is a cross-sectional view taken about lines 2—2 of FIG. 1 in a normally compressed state.

With specific reference to FIGS. 1 and 2, it may be seen that a flow line 10 is formed by a pair of pipe segments 12 and 16 respectively provided with flanges 14 and 18 which may be bolted together at an interface joint 11, for example, by means of nut and bolt sets 20 extending through bores 22 formed in flanges 14 and 18. Flow line 10 is adapted to convey a fluid 24 of any nature, whether liquid or gas, with fluid 24 typically being of a type to be used in industry. As is shown in FIG. 1, a pair of protective seals 26 and 28 are formed directly in the facing surfaces of flanges 14 and 18, respectively in order to protect the interface against leakage should flow line 10 be subjected to elevated temperatures.

Seals 26 and 28 are shown with greater specificity in FIG. 2 where it may be seen that seal 26 includes an annular channel 30 of rectangular cross-section is formed in surface 32 of flange 14. Channel 30 receives a mass 34 of intumescent material so that mass 34 surrounds axial flow path 36 of the flow line formed by pipe segments 12 and 16. Similarly, an annular channel 40 is formed through surface 42 of flange 18, and a mass 44 of intumescent material is disposed in annular channel 40. Thus, mass 44 surrounds flow path 36. It may be seen in this figure, that annular channel 30 has a greater radius than annular channel 40 so that the channels 30 and 40 are offset with respect to one another. Accordingly, joint 38 is formed by flanges 14 and 18.

Figure 3:
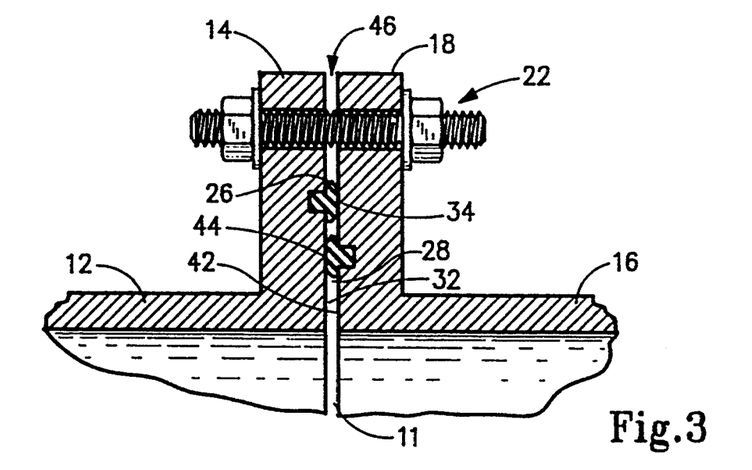
FIG. 3 is a cross-sectional view, similar to FIG. 2, but showing the protective seal in an activated state sealing a separation gap caused by thermal expansion due to exposure to elevated temperatures.

It should be understood that seals 26 and 28 operate to maintain a seal between flanges 14 and 18 when interface joint 11 is subjected to elevated temperatures. In FIG. 3, it may be seen that pipe segments 12 and 16 have been subjected to elevated temperatures, such as would exist in a fire, so that separation gap 46 is formed by the thermal expansion or warping of flanges 14 and 18 as well as thermal expansion of nut and bolt sets 22. Ordinarily, the fluid 24 conveyed by pipeline 10 would leak out separation gap 46 into the external environment. However, due to the expansive properties of the intumescent material forming masses 34 and 44, these masses swell under the influence of heat so that seals 26 and 28 are relatively maintained.

It should therefore be appreciated that the intumescent material used for masses 34 and 44 is accordingly formed of any suitable material known to expand under temperature increase at a selected activation temperature and which can withstand the temperatures normally associated with fire conditions. To this end, such materials known in the art include graphite catalyzed polyurethane, silicone, polyester and the like. Thus, the present invention, by the use of the term "intumescent material" contemplates these known expanding materials and similar such materials as are hereinafter developed in the industry. In any event, it should be further appreciated that channels 30 and 40 act as channeling structures which operate to direct the expansive flow of the intumescent material into the separation gap 46 and, in this embodiment, directly against the surface of the opposed flange. Thus, mass 34 is channeled into separation gap 46 and against surface 42 of flange 18 while intumescent mass 44 is channeled into separation gap 46 and against surface 32 of flange 14.

Figure 4A:
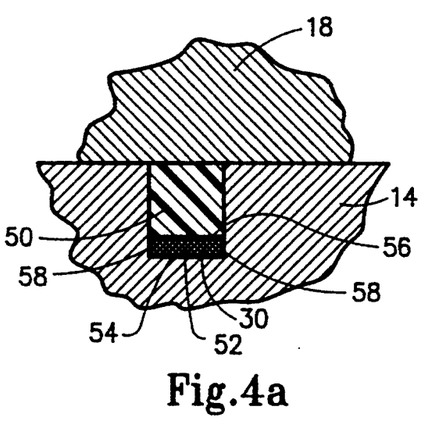
FIGS. 4(a) and 4(b) are cross-sectional views showing an alternative embodiment of a protective seal according to the present invention respectively in an inactivated state and in an activated state.
Figure 4B:
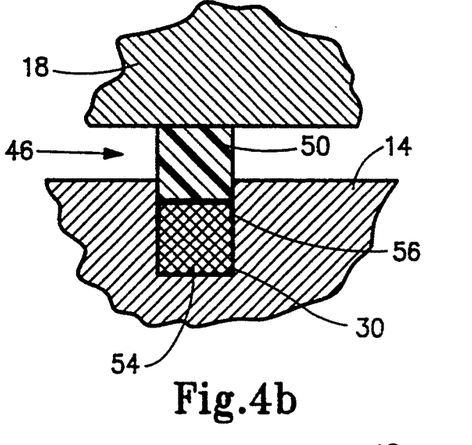

Although the intumescent material in FIGS. 1-3 is described to be the sealing means to fill the separation gap, and it can be used in this manner, it has been found preferably to use the intumescent material in conjunction with a normal ring seal element of graphite, polytetrafluoroethylene or similar material. Here, the expansion property of the activated intumescent material is used to physically move the ring seal axially outwardly away from the flange and into the separation gap to maintain a sealed relationship at the joint 11. Thus, for example, as is shown in FIGS. 4(a) and 4(b), a representative channel 30 is formed in representative flange 14. A seal element, such as a ring seal 50 is received in channel 30, and a layer of intumescent material 54 is positioned between seal 60 and bottom wall 52 of channel 30. An inverted U-shaped layer or diaphragm 56 is positioned between seal 50 and intumescent mass 54 with layer 56 having downwardly depending panels 58 which serve to retain intumescent mass 54 therein.

As is shown in FIG. 4(a), in the non-activated state, flange 18 abuts flange 14 so that flanges 14 and 18 are relatively sealed with respect to one another. However, when flanges 14 and 18 are subjected to elevated temperatures, as is shown in FIG. 4(b), flanges 14 and 18 move apart from one another to create separation gap 46. Intumescent mass 54, however, expands against diaphragm 56 which in turn acts on ring seal 50 to physically move ring seal 50 outwardly of channel 30 so that it is maintained in abutting relationship with flange 18 under the expansion force of the intumescent material.

Figure 5A:
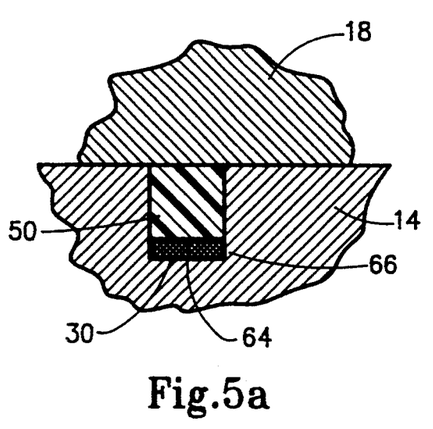
FIGS. 5(a) and 5(b) are cross-sectional views showing a third alternative embodiment of the present invention respectively in an inactivated state and in an activated state.
Figure 5B:
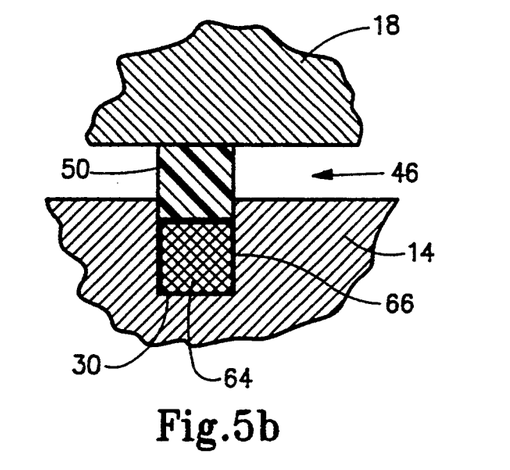

FIGS. 5(a) and 5(b) show a similar structure to FIGS. 4(a) and 4(b). Here, however, intumescent mass 64 is enclosed within a flexible bladder 66 and is disposed on the bottom of channel 30 formed in flange 14. Ring seal 50 is again provided and, as is shown in FIG. 5(b), when separation gap 46 results from thermal expansion, bladder 66 expands along with intumescent material 64 to physically move seal 50 outwardly of channel 50 thereby retaining it in contact with flange 18.

Figure 6A:
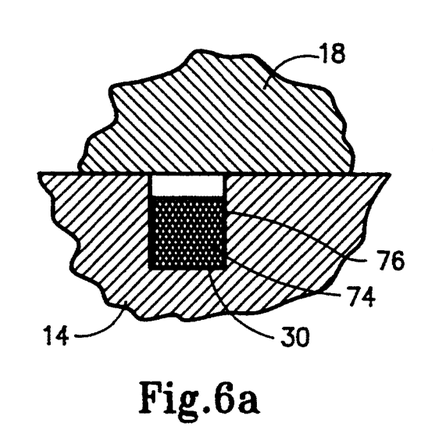
FIGS. 6(a) and 6(b) are cross-sectional views showing a fourth alternative embodiment of the protective seal according to the present invention respectively in an inactivated state and in an activated state.
Figure 6B:
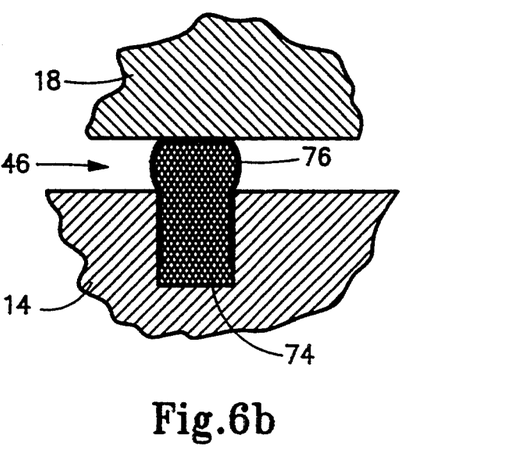

Yet another alternative embodiment of the protective seal according to the present invention is shown in FIG. 6(a) and 6(b). This seal is similar to that shown in FIGS. 1-3 with the exception that intumescent mass 74 is shown retained in an enlarged inverted U-shaped diaphragm 76 that is then positioned in channel 30, and ring seal 50 is eliminated. Upon thermal expansion, as is shown in FIG. 6(b), intumescent mass 74 expands to cause diaphragm 76 to maintain a sealed relationship with flange 18 thus effectively sealing separation gap 46. Accordingly, diaphragm 76 is constructed of a material that will seal against flange 18.

Figure 7:
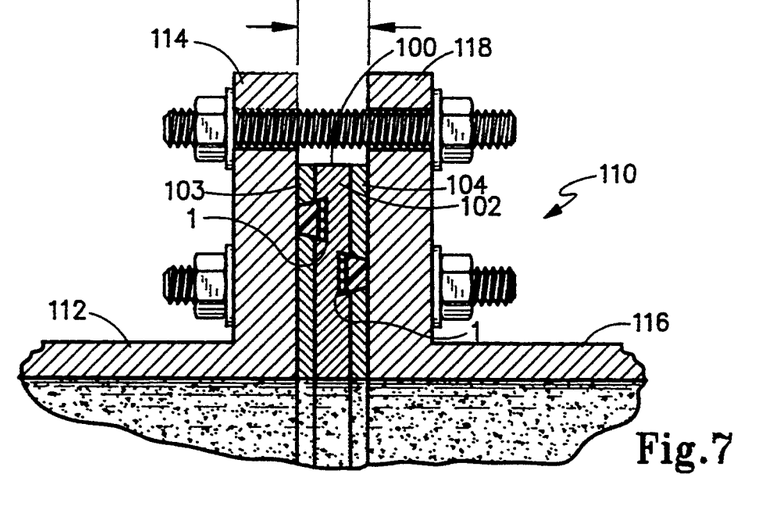
FIG. 7 is a cross-sectional view of a flange connection the interface between two pipe segments showing the use of the present invention in conjunction with an isolation gasket.
Figures 8A, 8B, 8C:
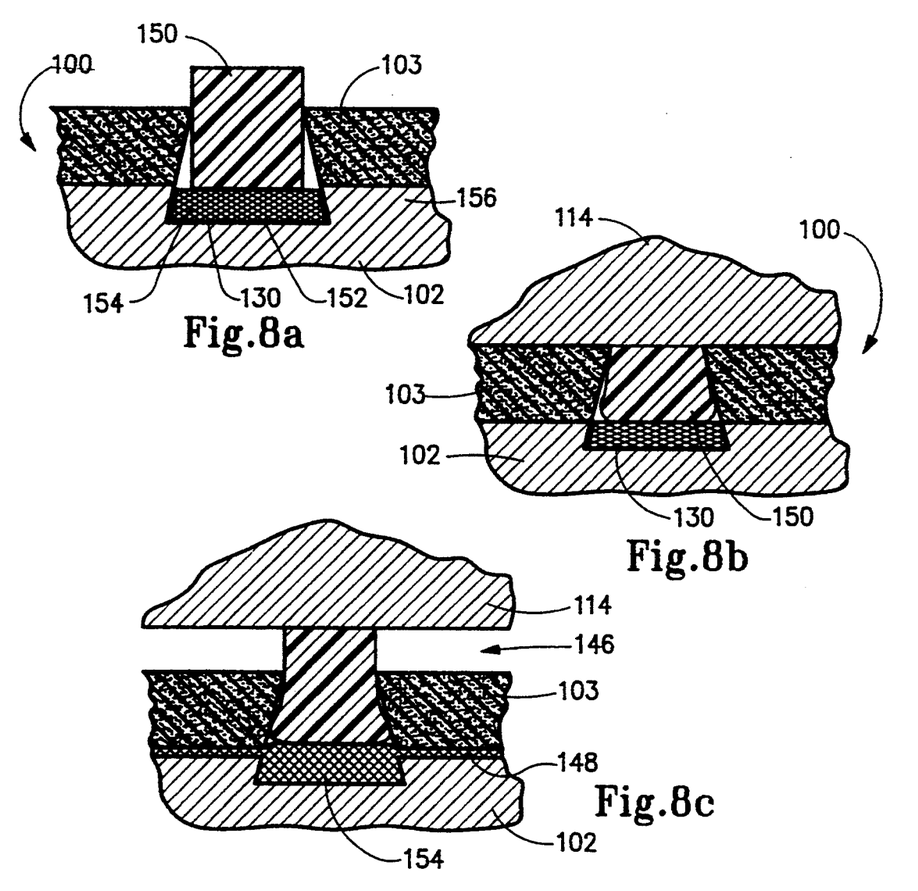
FIG. 8(a) is an enlarged cross-sectional view of a representative protective seal shown in FIG. 7 in an inactivated state and prior to compression.
FIG. 8(b) is a cross-sectional view, similar to FIG. 8(a), showing the protective seal in a compressed state prior to activation.
FIG. 8(c) is a cross-sectional view similar to FIG. 8(b) showing the protective seal of FIGS. 8(a) and 8(b) in an activated state sealing a separation gap after thermal expansion and separation.

While the general description of the exemplary embodiments of the present invention described with respect to FIGS. 1-6 contemplate the forming of the channeling structures in the flanges of joined pieces in a flow line, it is preferable to employ the protective seal according to the present invention in conjunction with a gasket device that is interposed between the joined pieces as is common in the art. Thus, for example, FIGS. 7 and 8 show the protective seal utilizing the intumescent material according to the present invention in an isolation gasket 100 that is positioned between flanges 114 and 118 of pipe segments 112 and 116 of flow line 110. Isolation gasket 100 may be of a type that is disclosed in U.S. Pat. No. 4,776,600 issued 11 Oct. 1988 to Kohn. This isolation gasket includes a central metallic core 102 which is sandwiched between two high elastic modulus glass reinforced epoxy laminates 103 and 104 in order to electrically isolate pipe segments 112 and 116 from one another. Of course, it should be understood that the features of the present invention can just as easily be implemented in a non-isolation gasket structure.

With greater reference to FIGS. 8(a) and 8(b), it may be seen that gasket 100 has a pair of dove-tail channels 130 formed in opposite side surfaces, and a ring seal 150 may be received in each channel 130. A mass of intumescent material 154 is interposed at the bottom of channel 130 between bottom wall 152 and seal 150 and a diaphragm 156 is disposed between intumescent mass 154 and seal 150. When flange 114 mounts against gasket 100, as is shown in FIG. 8(b), seal element 150 becomes compressed into the dove-tail configuration of channel 130. However, when subjected to thermal expansion, as is shown in FIG. 8(c), intumescent mass 154 activates to expand thereby forcing ring seal 150 into contact with flange 114 notwithstanding the formation of separation gap 146. Furthermore, with reference to FIG. 8(c), it may be seen that, where an isolation gasket 100 is used, the heat of the external environment sometimes delaminates epoxy layer 103 from metal core 102. In this situation, intumescent mass 154 can migrate into the delamination space 148 so as to assist in preventing or reducing any leakage of fluid through this space created by the delamination of the gasket layers. The dove-tail shape of channels 130 helps retain a seal for both ring seal 150 and the intumescent material 154 contained therein. By having a greater width at bottom wall 152, a space for the natural expansion of both the intumescent layer and the ring seal 150 is provided during compression. With this structure, also, substantially all of the intumescent energy is directed to axially force the ring seal 150 against the opposite flange to maintain the fluid seal.

Figure 9:
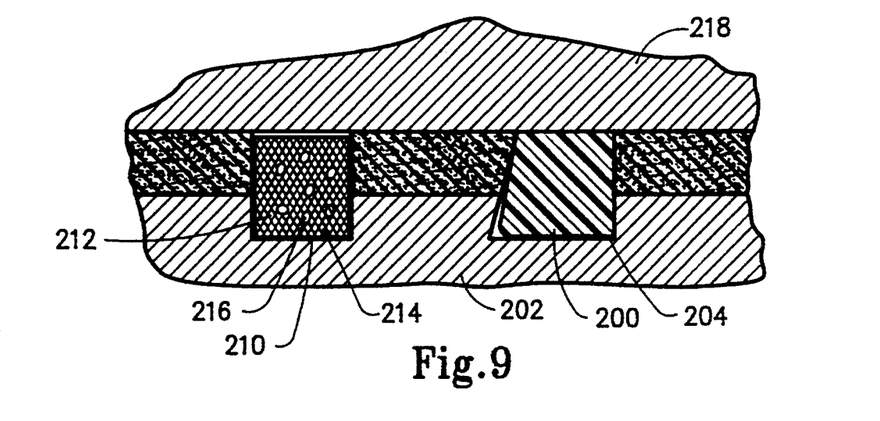
FIG. 9 is a cross-sectional view of another embodiment of the present invention used as an auxiliary seal in conjunction with an isolation gasket.

While the embodiment shown in FIGS. 7 and 8 show the use of intumescent material with a primary seal in a gasket structure, it should be understood that the protective seal could be formed as an auxiliary protective seal to supplement the normal primary seal for the interface joint between the joined pieces. Thus, as is shown in FIG. 9, primary seal 200 is provided by a gasket 202 with seal 200 being in the form of a ring seal received in channel 204 of gasket 200. An auxiliary seal 210 is provided in the form of a flexible bladder 212 filled with intumescent material 214 that, in this embodiment, includes reinforcing fibers 216. In normal use, primary seal 200 seals against flange 218 to prevent egress of fluid. Upon thermal separation, auxiliary 210 expands to maintain the seal between gasket 202 and flange 218.

Figure 10:
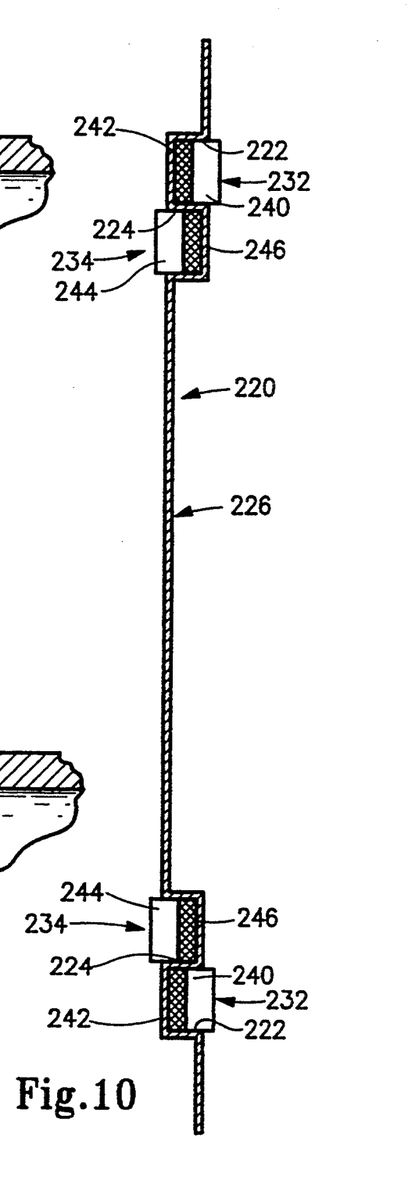
FIG. 10 is a cross-sectional view of another exemplary embodiment of the present invention in the form of a stamped gasket construction.

Another embodiment of the present invention employed with a gasket structure is shown in FIG. 10. Here, gasket 220 is formed as a stamped piece of metal or other formable substance. During the stamping operation, a pair of oppositely-facing, concentric channel structures 222 and 224 are produced in surrounding relationship to axial opening 226 that is adapted to permit flow of fluid therethrough when gasket 220 is interposed in a flow line. A first seal element 232 is disposed in channel structure 222, and a second seal element 234 is disposed in channel structure 224. Seal element 232 is constructed as a ring seal having an outer layer 240 of sealing material, such as graphite, polytetrafluoroethylene, etc., bonded to an inner layer 242. Likewise, seal element 234 is constructed to have an outer layer 244 of sealing material and an inner layer 246 of intumescent material bonded together. When gasket 220 is compressed between the flanges of adjacent flow line pieces, seal elements 232 and 234 act to prevent leakage of fluid. When exposed to elevated temperatures in excess of the activation of intumescent material, however, these layers 242 and 246 expand to drive layers 240 and 244 into any resulting separation gap thereby to help reduce or prevent leakage of fluid from the damaged flow line.

As noted above, it is known to construct spiral wound flow line gaskets for use in pipe systems. However, it is heretofore not known to employ intumescent material in such constructions in order to gain the protective benefits that have been described in this disclosure. An example of one configuration of a spiral wound gasket incorporating the teachings of the present invention is therefore shown in FIGS. 11 and 12. In these Figures, gasket 250 has an inner annulus or ring core 252 formed of suitable material, such as metal. A three-layered composite strip comprising a strip 254 of metal, a strip 256 of graphite (or other sealing material) and a strip 258 of intumescent material is then wound spoolwise around core 252 to create an annular seal region 260 for gasket 250. An outer annulus 262 is used to retain the spiral winding of the composite strip and to provide an outer boundary for gasket 250.

Figures 11, 12:
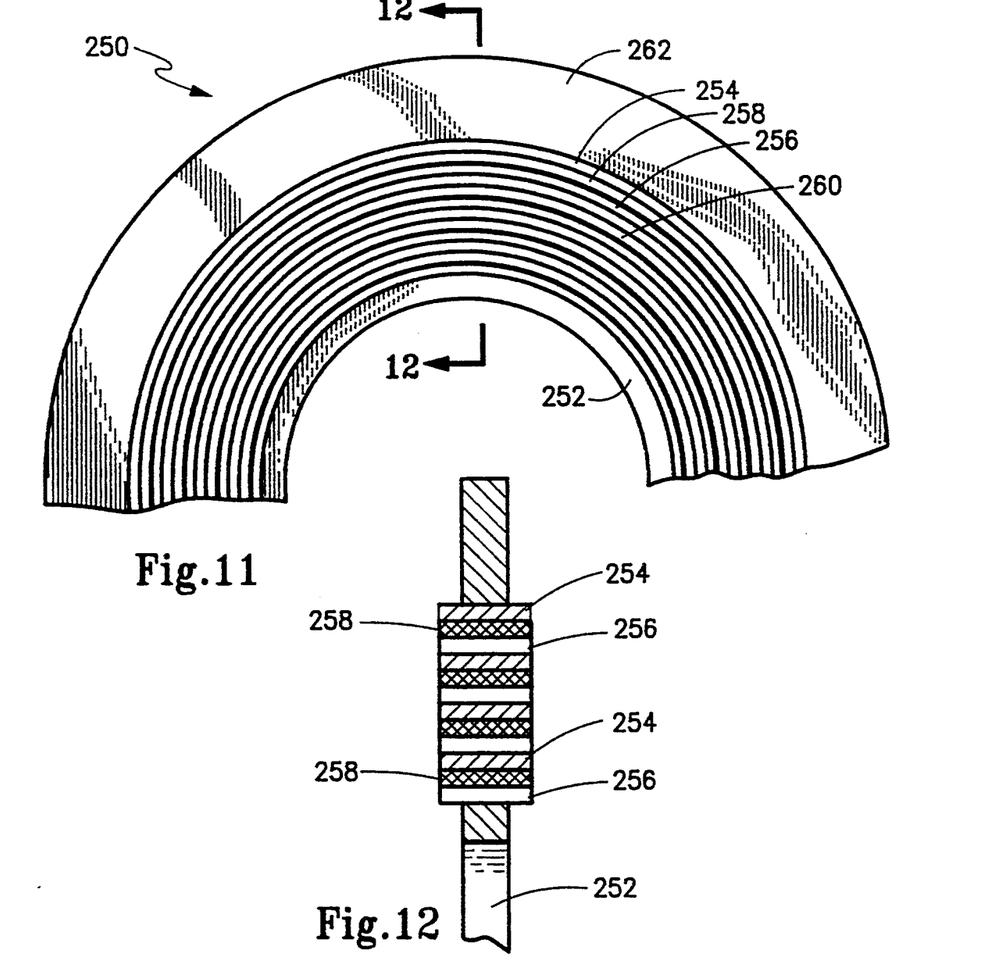
FIG. 11 is a front view in elevation of yet another exeplary embodiment of the present invention, here in the form of a spiral wound gasket.
FIG. 12 is a cross-sectional view taken about lines 12—12 of FIG. 11.

It should be understood in reference to FIGS. 11 and 12 that strips 254 and 256 act as channeling structures for the intumescent material of strip 258 in order to channel the intumescent material axially upon activation. Either of strips 254 or 256 could be eliminated from this structure, however, without departing from the scope of the invention. It is useful, though, to employ a sealing material of the types known in the art, and as discussed above, as the channeling strip since it can also function as a seal during normal use to prevent leakage of fluid from the flow line.

Figure 13:
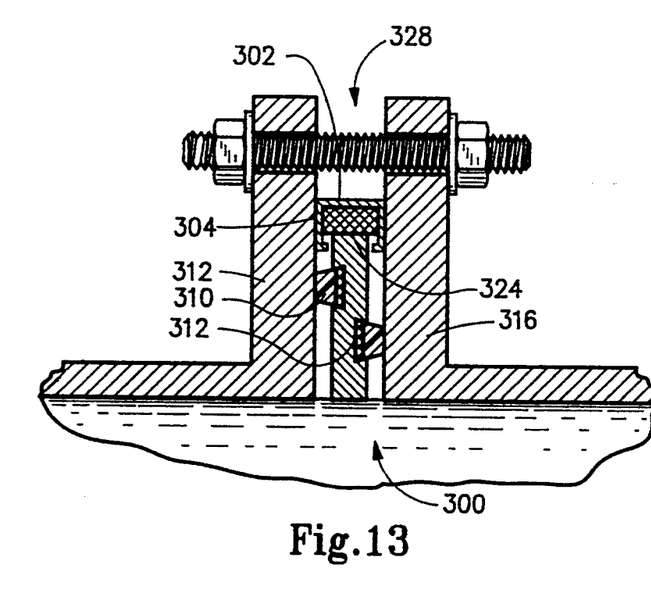
FIG. 13 is a cross-sectional view of a flange connection employing yet another gasket having an alternative embodiment of the present invention in an inactivated state.
Figure 14:
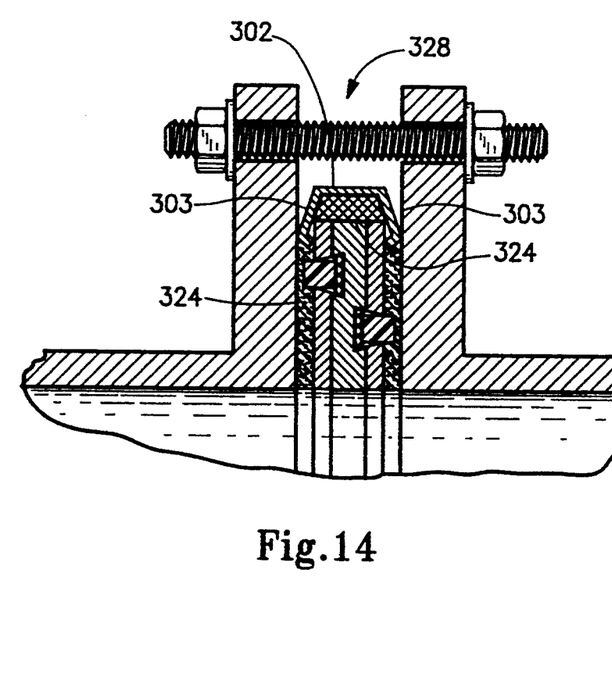
FIG. 14 is a cross-sectional view, similar to FIG. 13 but showing the gasket in an activated state.

Finally, with reference to FIGS. 13 and 14, it may be seen that yet another embodiment of the present invention provides a gasket 300 with a metallic rim in the form of annulus 302 which surrounds the peripheral edge 304 of gasket 300. Annulus 302 encloses a mass 324 of intumescent material, and primary seals 310 and 312 are provided for normally sealing gasket 300 between flanges 312 and 316. In FIG. 14, it may be seen that, upon activation, sidewalls 303 of annulus 302 will expand due to the expansion of intumescent material 324 to bear against flanges 312 and 316. Such expansion then channels intumescent material 324 radially inwardly thereby maintaining the integrity of the seal at joint 328.

From the foregoing, it should be appreciated that any of the exemplary embodiments of the present invention could be used in the various configurations disclosed or as would be apparent to the ordinarily skilled person in this field having reviewed the teachings of this disclosure. Furthermore, it should be understood that the method according to the present invention contemplates a method of protecting a fluid flow line that is operative to convey a fluid in order to retard leakage of the fluid at a separation gap which results from thermal separation at an interface between joined pieces forming the flow line when the joined pieces are subjected to a high temperature external environment.

This method broadly includes the step of disposing intumescent material at a location proximate to the interface between the joined pieces with this intumescent material having a selective activation temperature such that the intumescent material expands at temperatures greater than the activation temperature. Second, this method includes the step of channeling the intumescent material into the separation gap resulting when the joined pieces are subjected to temperatures greater than the activation temperature of the intumescent material. The intumescent material may be channeled either axially or radially (with respect to the direction of the flow line) into the separation gap according to this method. The more detailed method may include the steps of providing a seal element and expanding the intumescent material to advance the seal element into the separation gap.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A protective seal element for use in a fluid flow line that is operative to convey a fluid in order to retard leakage of fluid at a separation gap resulting from thermal separation of joined pieces forming said flow line when said joined pieces are subjected to a high temperature external environment, comprising:
   (a) intumescent material having a selected activation temperature such that said intumescent material expands at temperatures greater than the activation temperature; and
   (b) a channeling structure including at least one closed channel formed in at least one of said joined pieces, said channel having a bottom wall and including a diaphragm disposed in said channel whereby said intumescent material is disposed within said channel and located between said bottom wall and said diaphragm, said channeling structure operative to channel said intumescent material toward the separation gap when said joined pieces are subjected to temperatures greater than the activation temperature.

2. A protective seal according to claim 1 including a seal element disposed within said channel and positioned such that expansion of said intumescent material advances said seal element into the separation gap.

3. A protective seal according to claim 1 including a gasket element adapted to be disposed between said joined pieces, said gasket element including said channeling structure and said intumescent material.

4. A protective seal according to claim 3 wherein said gasket includes a gasket body, said channeling structure including an annulus extending around said gasket body and said intumescent material being retained in a region between said annulus and said gasket body.

5. A protective seal according to claim 3 wherein said gasket has opposite surfaces facing said joined pieces and has at least one closed channel formed in each of said surfaces, said intumescent material being disposed within each of the channels.

6. A protective seal according to claim 5 including a seal element disposed within each said channel and positioned such that expansion of said intumescent material within said channel advances said seal element into the separation gap.

7. A protective seal according to claim 3 wherein said channeling structure is formed as a first strip of a first material and said intumescent material is formed as a second strip, said first and second strips forming a coil structure defining a portion of said gasket element.

8. A protective seal according to claim 7 wherein said first material is selected from a group consisting of metal, graphite and tetraflouroethylene.

9. A protective seal according to claim 1 including a seal element disposed within said channel such that said diaphragm is located between said seal element and said intumescent material.

10. A protective seal according to claim 1 wherein said diaphragm is constructed of a seal material.

11. A protective seal according to claim 1 including a flexible bladder disposed in said channel, said intumescent material being located in said bladder.

12. A protective seal device adapted to be interposed between joined pieces in a flow line that is operative to convey a flow of fluid, said seal device for retarding leakage of the fluid at a separation gap resulting from thermal separation of said joined pieces when said joined pieces are subjected to a high temperature external environment, comprising:
   (a) a flat gasket body having opposite side surfaces facing said joined pieces and a central opening formed therethrough;

(b) a channeling structure including a channel formed in at least one of the side surfaces of said gasket body and extending around the central opening as a closed loop;

(c) intumescent material disposed in said channeling structure, said intumescent material having a selected activation temperature such that said intumescent material expands at temperatures greater than the activation temperature, said channeling structure operative to channel said intumescent material toward the separation gap when said joined pieces are subjected to temperatures greater than the activation temperature; and (d) a seal element disposed in said channel for retaining said intumescent material therein and configured as a diaphragm having an inverted U-shaped cross-section, said intumescent material operative upon expansion to maintain said seal element in a relatively sealing relationship with respect to the separation gap.

13. A protective seal device according to claim 12 wherein said seal element is configured as a ring seal having a rectangular cross-section, said intumescent material formed as a layer interposed between said seal element and a bottom wall of said channel.

14. A protective seal device according to claim 12 wherein said seal element is formed as an expandable bladder, said intumescent material being disposed within said bladder.

15. A protective seal device according to claim 12 wherein said channeling structure includes an annulus extending around said gasket body, said intumescent material being retained in a region between said annulus and said gasket body.

16. A protective seal device according to claim 12 wherein each said channeling structure includes a channel formed in each of said side surfaces of said gasket body, each of said channels extending around the central opening as a closed loop, and including a seal element disposed in each of said channel for retaining said intumescent material therein, said intumescent material operative upon expansion to maintain its respective said seal element in a relatively sealing relationship with respect to the separation gap.

17. A protective seal device according to claim 12 wherein said protective seal device is constructed to include a central ring structure and a multi-layer coil spiral wound around said central core, said multi-layer coil having a first strip of a first material defining said channeling structure and a second strip comprising said intumescent material.

18. A protective seal device according to claim 17 including a retaining ring extending around said multi-layer coil.

* * * * *